United States Patent [19]
Paxton et al.

[11] Patent Number: 5,993,116
[45] Date of Patent: Nov. 30, 1999

[54] FILLER-CONTAINING ROCK BOLT ANCHORING SYSTEM AND METHOD OF PREPARATION THEREOF

[75] Inventors: Ronald L. Paxton, Bristol, Va.; Joseph C. Zelanko, Cranberry Township, Pa.; Timothy J. Shean, Bristol, Va.

[73] Assignee: Sandvik Rock Tools, Inc., Bristol, Va.

[21] Appl. No.: 08/885,348

[22] Filed: Jun. 30, 1997

[51] Int. Cl.$^6$ ................................................ E21D 20/00
[52] U.S. Cl. ..................................... 405/259.6; 405/259.5
[58] Field of Search .............................. 405/259.6, 259.5, 405/259.1

[56] References Cited

U.S. PATENT DOCUMENTS

| | | |
|---|---|---|
| 3,731,791 | 5/1973 | Fourcade et al. . |
| 3,737,405 | 6/1973 | Linder et al. . |
| 4,252,894 | 2/1981 | Viro et al. . |
| 4,253,566 | 3/1981 | Seemann . |
| 4,255,277 | 3/1981 | Smearing . |
| 4,259,288 | 3/1981 | Welch . |
| 4,260,699 | 4/1981 | Plaisted . |
| 4,273,689 | 6/1981 | Smearing . |
| 4,280,943 | 7/1981 | Bivens et al. . |
| 4,341,301 | 7/1982 | Meyer et al. . |
| 4,353,463 | 10/1982 | Seemann . |
| 4,360,446 | 11/1982 | Smearing . |
| 4,433,119 | 2/1984 | Brode et al. . |
| 4,518,283 | 5/1985 | Gebauer et al. . |
| 4,616,050 | 10/1986 | Simmons et al. . |
| 4,651,875 | 3/1987 | Lang et al. ............................. 405/259.6 |
| 4,706,806 | 11/1987 | Mauthe ................................. 405/259.6 |
| 4,937,307 | 6/1990 | Chung . |
| 5,057,479 | 10/1991 | Bock . |
| 5,080,531 | 1/1992 | Kistner et al. . |
| 5,082,863 | 1/1992 | Apelian et al. . |
| 5,551,805 | 9/1996 | Arnold et al. ......................... 405/259.6 |
| 5,763,026 | 6/1998 | Makino et al. ........................ 405/259.6 |

*Primary Examiner*—William Neuder
*Assistant Examiner*—Frederick L. Lagman
*Attorney, Agent, or Firm*—Burns, Doane, Swecker & Mathis, L.L.P.

[57] ABSTRACT

Provided is a novel rock bolt anchoring system and a method of use thereof. The reactive grouting system, comprises: (a) a resin component containing an unsaturated polyester resin; and (b) a catalyst component separated from the polyester resin. The catalyst component comprises a catalyst effective to cross-link the polyester resin and a filler having a proportion of particles having a size of from 0.01 to 100 (preferably from 0.5 to 50 $\mu$m) and a mean particle size of 1 to 5 $\mu$m (preferably 3 to 5 $\mu$m). The system has particular applicability in the anchoring of mine bolts, facilitates installation of a reinforcing member, and is exceptionally fast in and strong upon curing.

17 Claims, No Drawings

FILLER-CONTAINING ROCK BOLT ANCHORING SYSTEM AND METHOD OF PREPARATION THEREOF

The present invention is related to the concurrently filed application Ser. No. 08/886,154, now abandoned, entitled, "Rock Bolt Anchoring System and Method of Use Thereof" (Attorney Docket No. 024003-073) the contents of which are hereby incorporated by reference.

BACKGROUND OF THE INVENTION

1. Field of the Invention

The present invention relates to a system for anchoring a reinforcement member or rock bolt in the hole of a rock formation or a structural body. More specifically, the present invention is directed to a novel two-component filler-containing rock bolt anchoring system. The present invention also relates to a method of preparing and method of using the rock bolting anchoring system.

2. Description of the Related Art

Reactive systems for anchoring reinforcing members in holes in rock formations or structural bodies are commonly used in various industries. For example, in the mining industry, reactive systems are used to secure bolts used in mine roofs to prevent collapse thereof.

Such systems typically include two components. The first component is a hardenable synthetic resin formulation, and the second component is a cross-linking catalyst formulation. Prior to use, the two components are kept isolated from one another. Upon mixing of the first and second components, the catalyst initiates a cross-linking reaction in the synthetic resin formulation, resulting in a hardened or cured resin. U.S. Pat. Nos. 4,260,699, 4,273,689, 4,280,943, 4,518,283 and 4,616,050 disclose various two-component systems, the contents of which are hereby incorporated by reference.

In two-component systems, the resin and the catalyst formulations can be held in separate compartments in a single container, commonly referred to as a capsule, a sausage, a cartridge, or an ampule. The two formulations are separated, for example, by one or more plastic walls or a plastic film. The capsule is inserted into a hole in the rock formation or body in which the bolt is to be secured. The bolt is then inserted through the capsule to the back of the hole and is then spun. The wall or walls separating the compartments are thereby broken, causing the resin formulation and the catalyst formulation to mix together and react, thereby hardening around the bolt. After being spun, the bolt is held in place by applying a force against the bolt until the resin is set.

The acceptance of a two-component rock bolt anchoring system is dependent upon numerous properties measured by those skilled in the art. Such properties include displacement, yield point, stall, cycle time and permanent displacement. Tests for many of those properties are known in the art. For example, various tests are provided in the MSHA Standard Block Test, the contents of which are hereby incorporated by reference.

A hardenable synthetic resin composition that has gained wide acceptance as a component of rock bolt anchoring systems is a composition containing an unsaturated polymerizable polyester resin and a monomeric polymerizable ethylenic cross-linking agent therefor. These materials, together with a polymerization inhibitor or stabilizer, and a promoter for a peroxide catalyst, constitute a first part of the system or the resin component. A peroxide catalyst system for initiating the crosslinking polymerization is contained in a second part of the system or the catalyst component. The catalyst component is kept separated from the resin component until the hardening reaction is to take place. When the two components are combined and mixed, the action of the catalyst causes the cross-linking reaction between the polyester and ethylenic monomer to take place, resulting in a thermoset, hard resin.

Particulate inert fillers or aggregates are nearly always added to the resin component of anchoring systems. Fillers have been reported (e.g., in U.S. Pat. No. 3,731,791) to reduce the shrinkage of the resinous mass which occurs during polymerization, and they also reduce the cost of the product because they replace a portion of the more-expensive resin composition. A variety of materials have been disclosed as fillers. See, e.g., U.S. Pat. No. 4,280,943, the disclosure of which is incorporated herein by reference. Therein, it is disclosed that, in order to ensure filler loadings in the 70–80 percent range while retaining adequate fluidity in resin-based compositions, the filler particle size distribution should be from 150 mesh to 300 mesh (0.05 mm to 0.1 mm).

As a result of the desire to reduce cost, the use of fillers in high concentrations has become very desirable over the years. However, as filler loading is pushed to higher levels, the flowability and dispersibility characteristics of the compositions decrease. Further, the strength of the final product weakens to the point that the resinous systems can no longer be utilized in securing or anchoring rock bolts.

In order to ameliorate the aforementioned problem, U.S. Pat. No. 4,616,050 describes a highly filled resin composition said to have improved flowability and dispersibility characteristics, and improved strength. Therein it is disclosed to employ a filler in the resinous component and, optionally, in the catalyst component which includes coarse particles.

The coarse filler comprises particles in a size range whose minimum is about 1 mm, and whose maximum is about 12.5 mm. The remainder of filler includes a fine filler component comprised of particles whose maximum size is below 1 mm. The presence of the coarse filler component in the composition results in a workable viscosity at high total filler concentrations and better dispersibility, requiring less strenuous mixing conditions when the resin composition is to be blended with a catalyst. The presence of larger amounts of filler in the resin component, and in the total product, is said not to deleteriously affect the presetting workability of the product (e.g., ease of bolt insertion and rotation therein in bolt-anchoring), and the anchorage strength of hardened grouts is improved.

While the above systems are known in the art, there remains a need in the art for additional means for providing highly filled systems while improving the flowability, dispersibility and strength characteristics.

SUMMARY OF THE INVENTION

Accordingly, a major object of the present invention is the provision of a novel highly filled rock bolt anchoring system, and in particular a mine bolt resin system, which facilitates installation of a reinforcing member and which is exceptionally fast in as well as strong upon curing.

It is a further object of the present invention to provide a container which holds components of the novel reactive grouting system in separate compartments.

It is a further object of the present invention to provide a method of using the novel reactive grouting system in anchoring a reinforcement member, such as a mine bolt.

Briefly, the present invention features a novel rock bolt anchoring system. The system comprises: (a) a resin component containing an unsaturated polyester resin; and (b) a catalyst component separated from the resin component. The catalyst component comprises a catalyst effective to cross-link the polyester resin and a filler. The filler is present in the catalyst component in an amount of at least 48% by weight of the catalyst component and at least 5% by weight of the filler comprises a group of particles having a size of from about 0.01 $\mu$m to 50 $\mu$m (preferably from about 0.5 to 25 $\mu$m) and a mean particle size of from about 1 to 5 $\mu$m (preferably from about 3 to 4 $\mu$m).

The present invention also features a container in which the rock bolt anchoring system is contained. The container comprises a plurality of compartments for separately containing the resin formulation and the cross-linking catalyst formulation of the system.

Lastly, this invention features a method of using the novel reactive system in anchoring a reinforcement member, such as a mine bolt, in an opening. The method comprises introducing the resin component and the catalyst component into the opening without contact therebetween, and inserting the reinforcement member into the opening, thereby causing the resin formulation and the cross-linking catalyst formulation to become mixed together and cured around the reinforcement member.

Other objects and advantages of the invention will become apparent from the following detailed description of the preferred embodiments thereof.

DETAILED DESCRIPTION OF THE PREFERRED EMBODIMENTS OF THE INVENTION

It has now surprisingly and unexpectedly been found that when used with a two-component rock bolt anchoring system, a catalyst component which contains a filler having a size of from about 0.01 to 50 $\mu$m (preferably about 0.5 $\mu$m to 25 $\mu$m) and a mean particle size of about 1 to 5 $\mu$m (preferably about 3 $\mu$m to 4 $\mu$m) provides several advantages over various prior art systems. For example, the inventive reactive system has been found to have improved strength and mixing characteristics over various prior art systems that do not contain such filler particles. Thus, the reactive grouting system very effectively fixes a reinforcing member as a result of the exceptional strength cycle time and stall of the system upon curing.

The first component of the reactive grouting system is a resin formulation. The resin used is an unsaturated polyester resin, with isothalic, orthothalic and terephthalic resins being preferred. Suitable resins are well understood by persons skilled in the art and can be formed, for example, from monomers such as styrene, vinyl toluene, methyl methacrylate, or mixture thereof. The polyester resin is preferably present in an amount in the range of from about 5 to 24 wt %, more preferably from about 8 to 12 wt %, based on the resin formulation.

Unsaturated polyester resins may be made by reacting dicarboxylic acids with glycols, using a polycondensation reaction. This process may be carried out in a stainless steel reactor at temperatures of about 410° F. Water is a byproduct of the reaction, and is removed by distillation during the reaction. When the reaction is complete, the resulting polyester is blended with styrene monomer. Inhibitors are added to provide shelf life and to adjust gel time. In prepromoted resins, various promoters, such as cobalt and dimethylaniline are added to provide room temperature curing capabilities with MEKP (methyl ethyl ketone peroxide) or BPO (benzoyl peroxide).

A suitable polyester resin for purposes of the invention may be prepared by reacting 60 moles of orthophthalic anhydride and 40 moles of maleic anhydride with 110 moles of propylene glycol. For a 100 pound batch, this translates to 34 pounds of orthophthalic anhydride, 15 pounds of maleic anhydride, and 110 pounds of propylene glycol. As a byproduct, 7 pounds of water will distill off. This reaction mixture is reacted to an acid number of about 30, and then thinned with styrene monomer and cooled to room temperature. Inhibitors, such as hydroquinone, promoters and other additives are added, and the resulting polyester resin is packaged into drums or other appropriate containers.

Alternatively, polyester resins commercially available such as Polylite 32 327-10 polyester resin (available from Reichhold Chemicals, Inc.) may be used. Preferred polyester resins will meet the following specifications:
1. Total non-volatiles (minimum weight percent) 61–65%
2. Water (maximum allowed) 0.15%
3. Acid number of dissolved resin 8 to 15
4. Gel time per QP4 1.0 (seconds) 11 to 14
5. Thixotropic Index (#3 Spindle-1/10rpm) 2 to 3.5
6. Viscosity per QP4 3.0 (centipoise) 2000 to 3500
7. Minimum Uncatalyzed Stability @ 123° C. (hours) 4.8
8. Viscosity stability After Being @ 71° C. (days) 5

One or more inorganic fillers may also be present in the polyester resin formulation in an amount in the range of from about 48 to 90 wt %, preferably from about 80 to 87 wt %, based on the resin formulation. Suitable fillers must be substantially inert to the components of the grouting system and include, for example, various forms of calcium carbonate, preferably limestone.

Other components can optionally be present in the polyester resin formulation. For example, an additional amount of the monomer or monomers which form the polyester resin can be added in an additional amount up to about 15 wt %, preferably in the range of from about 1.5 to 4 wt %, based on the resin formulation. This additional monomer is a reactive diluent, in that it acts both as a diluent for the resin formulation and initiates the cross-linking reaction.

One or more other diluents can also be added to the resin formulation. Suitable diluents include, for example, glycols such as ethylene glycol, diethylene glycol, etc. These diluents can be present in an amount of up to about 18 wt %, preferably in the range of from about 1 to 3 wt %, based on the resin formulation. In addition to acting as a diluent these materials provide internal lubrication and act as an antifreeze for exposure to extreme cold.

Various promoters can also be present in the polyester resin formulation, examples of which include diethanolamine (DEA), dimethylamine (DMA) and dimethylparatoluidine (DMPT). These promoters can be present in an amount up to about 2 wt %, preferably in the range of from about 0.1 to 1 wt %, based on the resin formulation.

Additionally, one or more colorants can be added to the resin formulation in an amount up to about 2 wt %, preferably in the range of from about 0.1 to 1 wt %, based on the resin formulation. Suitable colorants include, for example, carbon black and coal dust.

The resin formulation can further include inhibitors, such as benzoquinone, naphthoquinone and hydroquinone. These inhibitors can be present in an amount up to about 2 wt %, preferably in the range of from about 0.1 to 1 wt %, based on the resin formulation.

Other fillers can be added as needed for enhancement of properties such as, for example, penetrability, viscosity, internal lubrication and general flowability. Such fillers include, for example, talc, dolomite and mica. These fillers can be present in an amount up to about 30 wt %, preferably in the range of from about 5 to 15 wt %, based on the resin formulation.

The second component of the rock bolt anchoring system is a cross-linking catalyst formulation. The catalyst formulation includes a catalyst which promotes cross-linking and curing of the polyester resin when the two are mixed together. The catalyst is present in the catalyst formulation as a paste in an amount in the range of from about 1 to 24 wt %, preferably from about 4 to 14 wt %, based on the catalyst formulation. Suitable catalysts include organic peroxide compounds such as, for example, benzoyl peroxides, with dibenzoyl peroxide being preferred.

The catalyst component further includes one or more solid fillers for the enhancement of penetrability, viscosity, internal lubrication and general flowability. The filler is present in the catalyst formulation in an amount in the range of from about 48 to 90 wt %, preferably from about 62 to 75 wt %, based on the catalyst formulation. The filler is typically a form of calcium carbonate, preferably limestone.

The rock bolt anchoring systems of the present invention include in the catalyst component at least 5%, preferably 8% to 30%, and most preferably 14% to 20% of a filler having particles of a size ranging from about 0.01 µm to about 50 µm, preferably from about 0.5 to 25 µm. The mean particle size of these filler particles preferably ranges from about 1 µm to 5 µm, and most preferably from about 3 µm to about 4 µm.

In one preferred embodiment of the invention, the above-described filler particles are mixed with larger filler particles having a particle size ranging from about 0.1 µm to about 100 µm, preferably about 0.5 µm to 35 µm. The mean particle size of these filler particles preferably ranges from above about 5 µm to 10 µm and most preferably from about 6 µm to 7 µm. When mixing filler particles, the particles may be mixed prior to introduction into the catalyst component, simultaneously into the catalyst component or separately into the catalyst component. The ratio of large particles (i.e., those having a mean particle size of above 5 to 10 µm) to smaller particles (i.e., those having a mean particle size of 1 to 5 µm) is between 1 and 10, preferably between 3 and 5. In the catalyst composition, the larger particles are preferably present in an amount of between about 10 and 90%, more preferably between 30 and 80%, based upon the weight of catalyst the smaller particles are preferably present in an amount of between 5 and 40%, more preferably between 10 and 30%.

Because of the relatively viscous nature of the catalyst, use of viscosity modifiers may be helpful to ensure good flowability of the catalyst and to promote mixing within the resin formulation. The viscosity modifiers include mineral oil, water and/or a glycol. The mineral oil may be present in an amount in a range of from about 0.1 to 18 wt %, preferably from about 1 to 4 wt %, based on the catalyst component.

Water may be present in the catalyst formulation in an amount in the range of from about 1 to 18 wt %, preferably from about 8 to 12 wt %, based on the catalyst formulation. It is particularly preferred to use deionized water in the formulation.

Suitable glycols that may be used in the catalyst formulation include, for example, propylene glycol, dipropylene glycol and tripropylene glycol. Of these, dipropylene glycol is particularly preferred. The propylene glycol may be present in an amount in the range of from about 1 to 15 wt %, preferably from about 6 to 10 wt %, based on the catalyst formulation.

The catalyst component can also optionally include additional components, such as surfactants and emulsifiers. Such additional components can be present in the catalyst formulation in an amount up to about 5 wt %, preferably in the range of from about 0.5 to 2 wt %, based on the catalyst formulation.

The resin component and catalyst component may be used in proportions typically used by those skilled in the art. Generally, however, the weight ratio of resin component to catalyst component is preferable in a range of from 5 to 15, and more preferably in a range of from about 8 to 12. Of course, the conditions of the formation to be stabilized will affect how much of each component to utilize.

The following paragraphs provide a description of how the catalyst component, resin component and capsules of the present invention may be prepared and tested. It will be apparent to those skilled in the art that modifications may be practiced without departing from the purpose and intent of this disclosure. The descriptions are merely illustrative and should in no way be considered as limiting the scope of the claimed invention.

Catalyst Component Preparation A—Dipropylene Glycol-Free Catalyst Compositions

Into a 9 oz. glass jar, pour 27.3 grams of mineral oil. Add 35.4 grams of 55% benzoyl peroxide (BPO) paste. Mix at 1500 to 2000 RPM with a Dispermat mixer using a 1.5 inch high-shear impeller blade for 3 to 4 minutes. Slowly add 26.1 grams of deionized water while mixing. Using a small spatula, add small amounts of filler in a total amount of 192.3 grams while mixing. Continue mixing until there is a uniform and complete dispersion.

Catalyst Component Preparation B—Dipropylene Glycol Containing Catalyst Compositions Into a 9 oz. glass jar, pour 3.2 grams of mineral oil. Add 23.4 grams of dipropylene glycol (DPG). Mix at 1500 to 2000 RPM with a Dispermat mixer for 3 to 4 minutes using a 1.5 inch high-shear impeller blade. Add 35.4 grams of 55% BPO paste. Mix an additional 3 to 4 minutes at the same speed. Slowly add 31.1 grams of deionized water while mixing. Using a small spatula, add small amounts of filler in a total amount of 206.9 grams while mixing. Continue mixing until there is a uniform and complete dispersion.

Resin Component Preparation

Into a 16 oz. glass jar, pour 9.8 grams of styrene monomer, 16.4 grams of diethylene glycol (DEG), 55.8 grams of polyester resin meeting the specifications described above, 1.2 grams of dimethyl-paratoluidine (DMPT) and 0.7 grams of Color Black. Mix with a Dispermat mixer at 1500 to 2000 RPM for 3 to 4 minutes using a 1.5 inch three blade propeller. Using a small spatula, add small amounts of filler in a total amount of 516.1 grams while mixing. Continue mixing until there is a uniform and complete dispersion.

Capsule Preparation

A 12-inch length by 4¼ inch wide piece of Mylar film having a thickness of 2 mil is cut and placed on an electronic balance. Along one edge of the film, overlap a similar length of ¾ inch transparent tape and place film on scales. Tare the scales. From a container of the resin compound to be used, place small quantities of the compound along the length of the film and near the edge away from the tape. Evenly distribute the material along the film until there is 165 grams when using a #6 bolt or 212 grams when using a #5 bolt. Pick up the film along the compound edge and carefully roll it one time, enclosing the compound inside the film. This will leave a portion of the film and the tape flat and unrolled. Along this remaining edge, evenly distribute the catalyst to be used until there is a total of 20 grams when using a #6 bolt or 24 grams when using a #5 bolt. Lift the edge with the tape folding it over the roll of compound and sealing along the length of the film, forming an open-ended capsule. Fully enclose the material in the film by crimping each end of the film and securing with a small piece of the same tape. The final product is a crude representation of a machine-made capsule and can now be used to run any of the below-described block tests.

Insertion or Installation

Testing of mine bolt resin systems may be accomplished with a solid limestone block which measures 45 inches long by 30 inches wide by 15 inches deep. Into this block, holes are drilled which are one inch diameter by twelve inches deep. The intent is to approximate an actual in situ application of the product. The capsule to be tested may be cut to length depending on the size of bolt to be tested. There are two diameters of bolts used in a one inch hole, a #5 (⅝ inch) and a #6 (¾ inch). The length of test bolts is 15 inches from the bottom of the head to the end. For the smaller bolt, an 11-inch section of a 22 mm capsule is required to completely fill the annulus between the bolt and hole wall. For the larger bolt, a nine-inch section is used. The capsule section is then placed into the hole. The bolt is placed into the hole resting on the capsule. A ½ horsepower hand-held drill adapted with a chuck to fit the bolt head is then placed on the bolt head. With maximum downward pressure, the operator starts the drill, spinning the bolt and forcing it through the capsule to the bottom of the hole.

The following examples describe in detail various embodiments of the invention, as well as comparative examples. It will be apparent to those skilled in the art that modifications may be practiced without departing from the purpose and intent of this disclosure. Further, the following examples should in no way be considered as limiting the scope of the claimed invention.

Evaluation of Strength of Rock Bolt Anchoring Systems

The strength of the cured rock bolt anchoring systems described above was evaluated by measuring displacement and yield point. Displacement, measured in thousandths of an inch, is an indicator of the strength of the cured resin. A lower displacement is especially beneficial, since that measurement represents the extent of movement of a grouted system installed for the purpose of preventing such movement. Yield point, measured in tons, is the force at which the anchoring ability of a resin secured bolt is overcome.

Displacement and yield point measurements are accomplished by pull tests using a standard hollow centered Dyna-Pak 20 or 30 ton hydraulic ram and a limestone block. After the bolt has been installed and adequate time has been given for the resin to properly cure, usually 5 to 20 minutes, depending on resin speed, the pull test may be performed. To perform a pull test, the hydraulic ram is attached to the bolt which has been inserted into a 1 inch hole in the above-described limestone block, preloaded to one ton and the dial zeroed. Then, the hydraulic ram is pumped until the pump gage reads two tons. The displacement is read on the dial indicator and recorded in thousandths of an inch. This step is repeated, increasing the load by one ton increments and recording the displacement at each ton. The yield point is recorded as the maximum load which the cured system can support without system failure, or the maximum load prior to the system giving way at the interface between the system and the hole wall.

Desirably, the system will provide an average displacement measured over five runs of less than 210 thousandths of an inch employing a 10 ton load with a #6 rebar bolt and less than 240 thousandths of an inch employing a #5 rebar bolt. Desirably, the system will provide an average yield point measured over five runs of more than 10 and preferably more than 16 tons using a #6 rebar bolt; and more than 8 and preferably more than 12 tons using a #5 rebar bolt.

Comparative Examples 1–3

The catalyst component was prepared according to Catalyst Component Preparation A. The filler employed in the catalyst component was J-R CAMADIL® 99 available from Global Stone James River in Buchanan, Va. The properties of the filler are as follows:

Particle Size
  99 percent passing 325 mesh

Typical Physical Properties

| Median particle size | 9.8 Microns |
| Specific Gravity | 2.84 |
| Mohs Hardness | 3.85 |
| pH | 9.0–9.9 |
| Free Moisture | <0.1 Percent |
| Bulk Density | 68 lbs/Ft$^3$ |
| Oil Absorption | 15 lb/100 (ASTM D-281) |
| Dry Brightness (Hunter "Y") | 85 |

Typical Chemical Analysis

| $CaCO_3$ (Calcium Carbonate) | 55% |
| $MgCO_3$ (Magnesium Carbonate) | 43% |
| $SiO_2$ (Silicon Dioxide) | 0.6% |
| $Fe_2O_3$ (Ferric Oxide) | 0.2% |
| $Al_2O_3$ (Aluminum Oxide) | 0.03% |

Typical Screen Analysis (Cumulative % Finer than)

| 200 mesh | 100 |
| 325 mesh | 99 |
| 400 mesh | 95 |

The resin component was prepared using polyester resin according to the above-described process. The capsules were prepared by the above-described process.

Comparative Examples 4–6

The catalyst component was prepared according to Catalyst Component Preparation B. The filler employed in the catalyst component was J-R CAMADIL® 99. The resin component was prepared using polyester resin according to the above-described process. The capsules were prepared by the above-described process.

EXAMPLES 1–3

The catalyst component was prepared according to Catalyst Component Preparation B. The fillers employed were a combination of fillers (available from Franklin Ind. Minerals Crab Orchard, Tenn.). The properties of the fillers are as follows:

| FRANKLIN CF40 | |
| --- | --- |
| Hardness | 3 |
| pH | 9.0–9.5 |
| Specific Gravity | 2.67–2.75 |
| Hegman Grind | 5–6 |
| Particle Size | 0.5–25 µm |

-continued

| FRANKLIN CF40 | |
|---|---|
| Mean Particle Size | 3–4 microns |
| Maximum Percent Retained US #325 | 99.9965 +– .003% |
| Color | Neutral Beige |
| Moisture | .10% Max. |

| FRANKLIN CF70 | |
|---|---|
| Hardness | 3 |
| pH | 9.0–9.5 |
| Specific Gravity | 2.67–2.75 |
| Hegman Grind | 2½–3 |
| Particle Size | 0.6–35 µm |
| Mean Particle Size | 6–7 microns |
| Maximum Percent Retained US #325 | 99.65 +– .20% |
| Color | Neutral Beige |
| Moisture | .10% Max. |

The FRANKLIN CF40 filler was used in an amount of 17.1% based on the weight of the catalyst component. The FRANKLIN CF70 filler was used in an amount of 53.1% based on the weight of the catalyst component. The resin component was prepared using polyester resin as described above. The capsules were prepared by the above-described process.

TABLE 1

Strength Evaluation of Rock Bolt Anchoring Systems Using Pull Test*

| #5 Rebar | Comp Ex. 1 | Comp Ex. 2 | Comp Ex. 3 | Comp Ex. 4 | Comp Ex. 5 | Comp Ex. 6 | Ex. 1 | Ex. 2 | Ex. 3 |
|---|---|---|---|---|---|---|---|---|---|
| 2 Ton | .010 | .010 | .013 | .012 | .010 | .016 | .017 | .011 | .012 |
| 3 | .021 | .019 | .021 | .024 | .015 | .034 | .027 | .017 | .017 |
| 4 | .029 | .030 | .029 | .039 | .028 | .051 | .040 | .025 | .023 |
| 5 | .041 | .045 | .037 | .058 | .036 | .068 | .053 | .032 | .029 |
| 6 | .054 | .062 | .045 | .080 | .042 | .093 | .067 | .043 | .035 |
| 7 | .075 | .090 | .057 | .113 | .049 | .109 | .082 | .057 | .041 |
| 8 | .105 | .138 | .073 | .205 | .056 | .124 | .100 | .073 | .051 |
| 9 | .161 | .202 | .093 |  | .067 | .140 | .117 | .098 | .061 |
| 10 | .230 | .312 | .135 |  | .085 | .160 | .135 | .126 | .078 |
| 11 |  |  | .250 |  | .144 | .228 | .178 | .215 | .141 |
| 12 |  |  |  |  | .203 | .295 | .240 | .328 | .190 |
| 13 |  |  |  |  | .262 |  | .318 |  | .271 |
| 14 |  |  |  |  | .352 |  |  |  | .325 |
| 15 |  |  |  |  |  |  |  |  |  |
| Yield Point | 10 | 10 | 11 | 8 | 14 | 12 | 13 | 12 | 14 |
| Bled to | 9 | 8.5 | 9 | 6 | 13 | 11 | 12 | 10.5 | 12 |
| .100" mark | 7.5 | 7 | 9 | 6.5 | 10.5 | 6.5 | 8 | 9 | 10.5 |

*The displacement data included in Table 1 and in the tables that follow is shown in inches.

As illustrated above, when averaged, the best results were obtained when the conventional filler was replaced with a portion of fine particles (Examples 1–3). This data demonstrates that the use of the fine filler particles in the catalyst composition improves the strength of the anchoring system.

Comparative Examples 7–11

A rock bolt anchoring system was prepared according to the procedure described in Comparative Examples 1–3. The results of the pull tests are provided below in Table 2A.

TABLE 2A

Strength Evaluation of Rock Bolt Anchoring Systems Of Comparative Examples 7–11 Using Pull Test

| #5 Rebar | Comp. Ex. 7 | Comp. Ex. 8 | Comp. Ex. 9 | Comp. Ex. 10 | Comp. Ex. 11 |
|---|---|---|---|---|---|
| 2 Tons | .016 | .010 | .011 | .007 | .010 |
| 3 | .027 | .016 | .020 | .013 | .017 |
| 4 | .039 | .024 | .027 | .022 | .029 |
| 5 | .062 | .031 | .036 | .031 | .043 |
| 6 | .086 | .039 | .047 | .040 | .058 |
| 7 | .120 | .049 | .061 | .053 | .082 |
| 8 | .189 | .062 | .077 | .071 | .110 |
| 9 | .255 | .076 | .094 | .094 | .151 |
| 10 | .320 | .095 | .119 | .120 | .188 |
| 11 | .422 | .157 | .211 | .233 | .268 |
| 12 |  | .242 | .373 |  | .358 |
| 13 |  | .346 |  |  | .470 |
| 14 |  |  |  |  |  |
| 15 |  |  |  |  |  |
| Yield Point-Based on Max | 11 | 13 | 12 | 11 | 13 |
| Ave Yield Point |  |  | 12.0 |  |  |
| Tonnage at 0.100 Disp. | 6.5 | 10.0 | 9.0 | 9.0 | 7.5 |
| Ave. Tonnage at 0.100 Disp. |  |  | 8.4 |  |  |

Comparative Examples 12–16

A rock bolt anchoring system was prepared according to the procedure described in Comparative Examples 4–6. The results of the pull tests are provided below in Table 2B.

TABLE 2B

Strength Evaluation of Rock Bolt Anchoring
Systems Of Comparative Examples 12–16 Using Pull Test

| #5 Rebar | Comp. Ex. 12 | Comp. Ex. 13 | Comp. Ex. 14 | Comp. Ex. 15 | Comp. Ex. 16 |
|---|---|---|---|---|---|
| 2 Tons | .008 | .011 | .009 | .016 | .008 |
| 3 | .015 | .018 | .016 | .027 | .016 |
| 4 | .022 | .025 | .024 | .039 | .025 |
| 5 | .027 | .033 | .029 | .051 | .033 |
| 6 | .032 | .040 | .036 | .069 | .043 |
| 7 | .039 | .049 | .042 | .087 | .055 |
| 8 | .045 | .063 | .050 | .111 | .068 |
| 9 | .052 | .078 | .060 | .154 | .083 |
| 10 | .062 | .097 | .073 | .220 | .105 |
| 11 | .107 | .167 | .113 | .338 | .165 |
| 12 | .170 | .250 | .171 |  | .245 |
| 13 | .225 | .361 | .237 |  | .321 |
| 14 | .316 |  | .320 |  | .415 |
| 15 | .435 |  | .420 |  |  |
| Yield Point-Based on Max | 15 | 13 | 15 | 11 | 14 |
| Ave Yield Point |  |  | 13.6 |  |  |
| Tonnage at 0.100 Disp. | 11.0 | 10.0 | 10.5 | 7.5 | 10.0 |
| Ave. Tonnage at 0.100 Disp. |  |  | 9.8 |  |  |

TABLE 2C

Strength Evaluation of Rock Bolt Anchoring
Systems Of Examples 4–8 Using Pull Test

| #5 Rebar | Ex. 4 | Ex. 5 | Ex. 6 | Ex. 7 | Ex. 8 |
|---|---|---|---|---|---|
| 2 Tons | .008 | .008 | .009 | .005 | .010 |
| 3 | .014 | .015 | .020 | .010 | .017 |
| 4 | .021 | .023 | .030 | .014 | .025 |
| 5 | .028 | .032 | .041 | .022 | .033 |
| 6 | .035 | .041 | .051 | .027 | .041 |
| 7 | .043 | .054 | .065 | .035 | .050 |
| 8 | .053 | .073 | .082 | .045 | .062 |
| 9 | .064 | .099 | .100 | .057 | .080 |
| 10 | .080 | .139 | .125 | .072 | .096 |
| 11 | .142 | .290 | .220 | .124 | .163 |
| 12 | .208 |  |  | .187 | .242 |
| 13 | .296 |  |  | .268 | .338 |
| 14 |  |  |  |  |  |
| 15 |  |  |  |  |  |
| Yield Point-Based on Max | 13 | 11 | 11 | 13 | 13 |
| Ave Yield Point |  |  | 12.2 |  |  |
| Tonnage at 0.100 Disp. | 10.5 | 9.0 | 9.0 | 10.5 | 10.0 |
| Ave. Tonnage at 0.100 Disp. |  |  | 9.8 |  |  |

EXAMPLES 4–8

A rock bolt anchoring system was prepared according to the procedure described in Examples 1–3. The results of the pull tests are provided below in Table 2C.

EXAMPLES 9–16

A rock bolt anchoring system was prepared according to the procedure described in Examples 1–3 except the filler level was increased by adding more CF-70 in an effort to optimize viscosity and lower cost. The CF-70 was present in an amount of 62.5% based on the total catalyst. The CF-40 was present in an amount of 15.6% based on the total catalyst. The results of the pull tests are provided below in Table 2D.

TABLE 2D

Strength Evaluation of Rock Bolt Anchoring
Systems of Examples 9–16 Using Pull Test

| #5 Rebar | Ex. 9 | Ex. 10 | Ex. 11 | Ex. 12 | Ex. 13 | Ex. 14 | Ex. 15 | Ex. 16 |
|---|---|---|---|---|---|---|---|---|
| 2 Tons | .008 | .009 | .014 | .010 | .007 | .006 | .010 | .007 |
| 3 | .015 | .017 | .027 | .017 | .015 | .012 | .016 | .014 |
| 4 | .023 | .024 | .042 | .023 | .022 | .018 | .021 | .020 |
| 5 | .030 | .032 | .060 | .029 | .029 | .025 | .028 | .027 |
| 6 | .038 | .038 | .079 | .035 | .036 | .033 | .034 | .034 |
| 7 | .050 | .046 | .098 | .043 | .046 | .044 | .042 | .041 |
| 8 | .063 | .056 | .140 | .052 | .059 | .060 | .053 | .051 |
| 9 | .077 | .070 | .195 | .066 | .075 | .081 | .070 | .062 |
| 10 | .096 | .085 | .288 | .084 | .099 | .109 | .093 | .079 |
| 11 | .160 | .161 |  | .177 | .177 | .218 | .170 | .135 |
| 12 | .234 | .228 |  | .260 | .194 | .330 | .268 | .194 |
| 13 | .328 | .302 |  | .399 | Block | .530 |  | .278 |
| 14 | .435 | .440 |  |  | Broke |  |  | .380 |
| 15 | .560 |  |  |  |  |  |  | Broke |
| Yield Point-Based on Max | 16 | 15 | 11 | 14 | 13 | 14 | 13 | 15 |
| Ave Yield Point |  |  |  |  | 13.9 |  |  |  |
| Tonnage at 0.100 Disp. | 10.0 | 10.5 | 7.0 | 10.0 | 10 | 10.0 | 10.5 | 10.5 |
| Ave. Tonnage at 0.100 Disp. |  |  |  |  | 9.8 |  |  |  |

EXAMPLES 17–19

The catalyst component was prepared according to Catalyst Component Preparation A. The filler employed was the combination of fillers described in Examples 1–3. The resin component was prepared using Stypol 743102 type polyester resin. The capsules were prepared as described above. The results of the pull tests are provided below in Table 2E.

TABLE 2E

Strength Evaluation of Rock Bolt Anchoring Systems of Examples 17–19 Using Pull Test

| #5 Rebar | Ex. 17 | Ex. 18 | Ex. 19 |
| --- | --- | --- | --- |
| 2 Tons | .008 | .008 | .006 |
| 3 | .015 | .014 | .012 |
| 4 | .023 | .021 | .018 |
| 5 | .029 | .027 | .025 |
| 6 | .038 | .033 | .032 |
| 7 | .047 | .042 | .041 |
| 8 | .058 | .054 | .053 |
| 9 | .074 | .067 | .068 |
| 10 | .095 | .088 | .087 |
| 11 | .176 | .173 | .142 |
| 12 | .266 | .270 | .220 |
| 13 | .405 | .410 | .375 |
| 14 | | | |
| 15 | | | |
| Yield Point-Based on Max | 13 | 13 | 13 |
| Ave Yield Point | | 13 | |
| Tonnage at .100 Disp. | 10 | 10 | 10 |
| Ave. Tonnage at .100 Disp. | | 10 | |

As illustrated above in Tables 2A–2E, the average value of the yield point and displacement of the Examples of the present invention were improved over the Comparative Examples.

Evaluation of Stall of Rock Bolt Anchoring System

The stall of the anchoring system is a measure of the time it takes the system to set up and/or cure. The stall, measure in seconds, is the total time from the beginning of bolt insertion until the point at which the drill is brought to a complete stop. A maximum down ward force and grip to keep the drill from turning must be applied until complete stall is reached. At the instant the drill stops, the operator notes the time, to the nearest half second, and immediately releases the drill trigger. The stall time is then recorded. A fast stall is especially beneficial, since that measurement is directly related to the speed of inserting the rock bolts. Preferable, an average stall measure time over 10 runs of less than 18 seconds and more preferably less than 15 seconds is obtained when employing a #5 rebar bolt and a ½ horsepower drill.

Comparative Examples 17–29

A rock bolt anchoring system was prepared according to the procedure described in Comparative Examples 1–3.

Comparative Examples 30–43

A rock bolt anchoring system was prepared according to the procedure described in Comparative Examples 4–6.

EXAMPLES 20–32

A rock bolt anchoring system was prepared according to the procedure described in Examples 1–3.

EXAMPLES 33–42

The catalyst component was prepared according to Catalyst Component Preparation A. The filler employed was the combination of fillers described in Examples 1–3. The resin component was prepared using polyester resin as described above. The capsules were prepared as described above.

The measure of stall was performed on the anchoring systems described in Comparative Examples 17–43 and Examples 20–42. Test were done on limestone blocks using both #5 and #6 rebar.

TABLE 3

Stall Evaluation of Rock Bolt Anchoring Systems Using Block Test

| #5 Rebar | Comp. Ex. 17–26 | Comp. Ex. 30–40 | Ex. 20–29 | Ex. 33–42 |
| --- | --- | --- | --- | --- |
| Stall (sec) | 22 | 12 | 9 | 16 |
| | 15 | 11.5 | 9.5 | 10 |
| | 18 | 14 | 7.5 | 14 |
| | 18.5 | 18 | 10 | 13 |
| | 15 | 15 | 8 | 13 |
| | 24 | 10.5 | 18 | 17 |
| | 14 | 11 | 10.5 | 13.5 |
| | 17 | 12 | 22 | 14 |
| | 14.5 | 16 | 8.5 | 11 |
| | 21.5 | 17.5 | 16 | 12.5 |
| Ave. (sec) | 18.0 | 13.8 | 11.9 | 13.4 |

| #6 Rebar | Comp. Ex. 27–29 | Comp. Ex. 41–43 | Ex. 30–32 |
| --- | --- | --- | --- |
| Stall (sec) | 8.5 | 9 | 9 |
| | 8.5 | 8 | 7.5 |
| | 8 | 8 | 7 |
| Ave. (sec) | 8.3 | 8.3 | 7.8 |

As indicated above in Table 3, the stall of the rock bolt anchoring systems of the present invention were superior to the stall of the comparative examples.

Evaluation of Cycle Time of Rock Bolt Anchoring Systems

The cycle time of the rock bolt anchoring systems described above was also evaluated. Cycle time, measured in second, is a measure of the setup time of the resin, or in other words, the reactivity of the system. It is a measure of the total time from the beginning of bolt insertion until the point at which the bolt can no longer be turned by hand. In terms of torque, the cycle time is the total time from the beginning of bolt insertion until the point at which the bolt can no longer be turned under a 5 lb torque.

A cycle time test is performed using the installation procedure described above, and using a stop watch to measure the time. The time starts when the drill begins. When the bolt reaches the bottom of the hole, usually 3 to 5 seconds, the operator immediately stops the drill, lifting it from the bolt head, and grabs the bolt with his hand while attempting to turn it. The time stops at the point when the operator can no longer turn the bolt. Preferably, the cycle time is less than 12 seconds and more preferably less than 5 seconds when 5 lbs of torque is applied to the bolt head.

Comparative Examples 44–58

A rock bolt anchoring system was prepared according to the procedure described in Comparative Examples 1–3.

Comparative Examples 59–73

A rock bolt anchoring system was prepared according to the procedure described in Comparative Examples 4–6.

EXAMPLES 43–57

A rock bolt anchoring system was prepared according to the procedure described in Examples 1–3.

EXAMPLES 58–67

The catalyst component was prepared according to catalyst Component Preparation A. The filler employed was the combination of fillers described in Examples 1–3. The resin component was prepared using polyester resin as described above. The capsules were prepared as described above.

The measure of cycle time was performed on the anchoring systems described in Comparative Examples 44–73 and Examples 43–67. Test were done on limestone blocks using #5 rebar.

TABLE 4

Evaluation of Cycle Time of Rock Bolt Anchoring Systems

|  | Comp. Ex. 44–58 | Comp. Ex. 59–73 | Ex. 43–57 | Ex. 58–67 |
|---|---|---|---|---|
| Cycle Time (sec) | 5.5 | 6 | 4.5 | 4 |
|  | 4.5 | 8 | 5 | 3.5 |
|  | 6.5 | 6.5 | 4 | 5 |
|  | 5 | 7 | 4 | 4 |
|  | 5 | 6 | 4.5 | 4 |
|  | 7 | 6 | 4 | 3.5 |
|  | 7 | 7 | 4.5 | 3.5 |
|  | 5.5 | 7.5 | 4 | 4 |
|  | 10 | 6 | 4.5 | 4 |
|  | 6.5 | 7 | 4 | 4 |
|  | 8 | 5 | 4 |  |
|  | 6.5 | 6.5 | 4.5 |  |
|  | 6 | 5 | 4 |  |
|  | 7.5 | 6 | 4.5 |  |
|  | 8.5 | 5 | 3.5 |  |
| Ave. (sec) | 6.6 | 6.3 | 4.2 | 3.95 | as indicated above in Table 4, the cycle time of the rock bolt anchoring systems of the present invention were superior to the cycle time of the comparative examples.

Permanent Displacement Evaluation of Rock Bolt Anchoring Systems

The strength of the rock bolt anchoring systems described above was evaluated by determining the permanent displacement. These measures of permanent displacement were obtained by employing the evaluation of strength test described, above with one exception. At the operator's discretion, the loading of the bolt is stopped, usually after it has passed the ten ton minimum, and the pressure is bled off to the original pre-load point of the ton. This relaxes the stretch in the bolt itself and allows the dial indicator to return to a lower reading. This reading represents the permanent displacement and is a true indication of the movement of the grouted column.

Comparative Examples 74–78

A rock bolt anchoring system was prepared according to the procedure described in Comparative Examples 1–3. The results of the test are provided below in Table 5A.

TABLE 5A

Permanent Displacement Evaluation Of Comparative Examples 74–78 Using Pull Test

|  | Comp. Ex. 74 | Comp. Ex. 75 | Comp. Ex. 76 | Comp. Ex. 77 | Comp. Ex. 78 |
|---|---|---|---|---|---|
| 2 Ton | .011 | .010 | .020 | .010 | .008 |
| 3 | .019 | .015 | .041 | .018 | .013 |
| 4 | .029 | .022 | .074 | .028 | .020 |
| 5 | .039 | .033 | .108 | .045 | .026 |
| 6 | .052 | .049 | .164 | .065 | .034 |
| 7 | .099 | .077 | .242 | .108 | .043 |
| 8 | .151 | .133 | Failure | Failure | .055 |
| 9 | Failure | Failure |  |  | .069 |
| 10 |  |  |  |  | .088 |
| 11 |  |  |  |  | .148 |
| 12 |  |  |  |  | .247 |
| 13 |  |  |  |  |  |
| PD |  |  |  |  | .200 |
| Avg. |  |  | 9.4 |  |  |

EXAMPLES 68–72

A rock bolt anchoring system was prepared according to the procedure described in Examples 1–3. The results of the test are provided below in Table 5B.

TABLE 5B

Permanent Displacement Evaluation of Examples 68–72 Using Pull Test

|  | Ex. 68 | Ex. 69 | Ex. 70 | Ex. 71 | Ex. 72 |
|---|---|---|---|---|---|
| 2 Ton | .017 | .010 | .011 | .010 | .009 |
| 3 | .035 | .018 | .020 | .019 | .019 |
| 4 | .052 | .026 | .030 | .027 | .029 |
| 5 | .071 | .035 | .041 | .036 | .039 |
| 6 | .105 | .045 | .052 | .044 | .052 |
| 7 | .154 | .057 | .064 | .053 | .067 |
| 8 | .215 | .069 | 0.08 | .065 | .092 |
| 9 | .303 | .082 | .097 | .076 | .185 |
| 10 | Failure | .096 | .116 | .094 | Failure |
| 11 |  | .130 | .162 | .146 |  |
| 12 |  | .180 | .204 | .188 |  |
| 13 |  | .250 | .260 | .248 |  |
| PD |  | .208 | .198 | .195 |  |
| Avg. |  |  | 12.4 |  |  |

EXAMPLES 73–77

A rock bolt anchoring system was prepared according to the procedure described in Examples 1–3 except that the filler ratio of CF-70 to CF-40, as well as the total filler amount, was changed in an effort to optimize viscosity and cost. The increase from about 70% to about 77% proved to be too viscous to pump, however. The results of the test are provided below in Table 5C.

TABLE 5C

Permanent Displacement Evaluation Of Examples 73–77 Using Pull Test

|  | Ex. 73 | Ex. 74 | Ex. 75 | Ex. 76 | Ex. 77 |
|---|---|---|---|---|---|
| 2 Ton | .023 | .007 | .011 | .013 | .010 |
| 3 | .034 | .013 | .019 | .028 | .018 |
| 4 | .045 | .020 | .027 | .045 | .026 |
| 5 | .057 | .027 | .034 | .067 | .034 |
| 6 | .075 | .036 | .042 | .118 | .045 |

TABLE 5C-continued

Permanent Displacement Evaluation
Of Examples 73–77 Using Pull Test

|    | Ex. 73  | Ex. 74  | Ex. 75  | Ex. 76  | Ex. 77  |
|----|---------|---------|---------|---------|---------|
| 7  | .098    | .047    | .053    | Failure | .055    |
| 8  | .132    | .060    | .066    |         | .075    |
| 9  | .193    | .084    | .088    |         | .099    |
| 10 | .275    | .115    | .115    |         | .129    |
| 11 | Failure | .250    | .176    |         | .230    |
| 12 |         | Failure | Failure |         | Failure |
| 13 |         |         |         |         |         |
| PD Avg. |    |         | 10.8    |         |         |

As illustrated by comparing the data reported in Tables 5A–5C, the composition of the present invention provided superior permanent displacement measurements. Further, the average yield point was substantially higher.

While the invention has been described in detail with reference to specific embodiments thereof, it will be apparent to those skilled in the art that various changes and modifications can be made, and equivalents employed, without departing from the scope of the appended claims.

What is claimed is:

1. A rock bolt anchoring system, comprising:
   (a) a resin component containing an unsaturated polyester resin; and
   (b) a catalyst component separated from the resin component, comprising a catalyst effective to cross-link the polyester resin and a filler, wherein said filler is present in said catalyst component in an amount of at least 48% by weight of said catalyst component and at least 5% by weight of said filler comprises a group of particles having a size of from about 0.01 to 100 μm and a mean particle size of about 1 to 5 μm.

2. The rock bolt anchoring system of claim 1, wherein said filler comprises a group of particles having a size of from about 0.5 to 25 μm and a mean particle size of from about 3 to 4 microns.

3. The rock bolt anchoring system of claim 1, wherein all of the filler particles in said catalyst component are less than 1 mm.

4. The rock bolt anchoring system of claim 1, wherein all of the filler particles in said catalyst component are less than about 100 μm.

5. The rock bolt anchoring system according to claim 4, wherein the catalyst is dibenzoyl peroxide.

6. The rock bolt anchoring system of claim 1, wherein at least about 5% by weight of said filler comprises a second group of particles having a size of from about 0.1 to 100 μm and a mean particle size of between above 5 μm and 10 μm or less.

7. The rock bolt anchoring system of claim 6, wherein said second group of particles has a size of from about 0.5 μm to 35 μm and a mean particle size of about 6 to 7 μm.

8. The rock bolt anchoring system of claim 6, wherein said particles having a mean particle size of about 1 to 5 microns are present in an amount of from 10 to 90% by weight of said filler, and said particles having a mean particle size of about 6 to 10 microns are present in an amount of from 90 to 10% by weight of said filler.

9. The rock bolt anchoring system of claim 1, wherein said catalyst component further comprises a glycol.

10. The rock bolt anchoring system according to claim 9, wherein the glycol is selected from the group consisting of propylene glycol, dipropylene glycol and tripropylene glycol.

11. The rock bolt anchoring system according to claim 10, wherein the glycol is dipropylene glycol.

12. The rock bolt anchoring system according to claim 1, wherein the catalyst is a peroxide.

13. The rock bolt anchoring system according to claim 1, wherein in the catalyst component, the catalyst is present in an amount in the range of from about 1 to 24 wt %, the filler is present in an amount in the range of from about 48 to 90 wt %, mineral oil is present in an amount in the range of from about 0.1 to 18 wt %, water is present in an amount in the range of from about 1 to 18 wt %, and propylene glycol is present in an amount in the range of from about 1 to 15 wt %.

14. A container comprising at least one compartment for containing the resin component and at least one compartment for containing the catalyst component of the system according to claim 1.

15. A method of using the rock bolt anchoring system according to claim 1 in anchoring a reinforcing member in an opening, comprising introducing the resin component and the catalyst component into the opening in a manner such that the components are separated, and inserting the reinforcing member into the opening, thereby causing the resin component, and the catalyst component to become mixed together and to cure around the reinforcing member.

16. The method according to claim 15, wherein the resin component and the catalyst component of the reactive grouting system are separately contained in a plurality of compartments in a container capsule.

17. A rock bolt anchoring system, comprising:
   (a) a resin formulation, comprising an unsaturated polyester resin and a filler; and
   (b) a cross-linking catalyst formulation separated from the polyester resin formulation, comprising a catalyst component effective to cross-link the polyester resin and a filler,
   wherein the filler is present in said catalyst component in an amount of at least 48% by weight of said catalyst component and at least 5% by weight of said filler comprises a group of particles having a size of from 0.5 to 25 μm and a mean particle size of 1 to 5 μm, the system has an average cycle time over ten runs of less than about 5 seconds, an average displacement over five runs at 12 tons of less than about 0.240 inches, and an average yield strength over five runs of greater than about 12 tons, when tested with a #5 rebar.

* * * * *